United States Patent Office 3,757,002
Patented Sept. 4, 1973

3,757,002
CATALYTIC POLYMERIZATION OF OLEFINS USING CYCLOPENTADIENE MODIFIED SUPPORTED DIARENE CHROMIUM COMPOUNDS
Frederick J. Karol, Somerset, N.J., assignor to Union Carbide Corporation, New York, N.Y.
No Drawing. Continuation-in-part of application Ser. No. 15,931, Mar. 2, 1970, which is a continuation-in-part of application Ser. No. 828,745, May 28, 1969, both now abandoned. This application Sept. 24, 1971, Ser. No. 183,701
Int. Cl. C08f 1/58, 3/06
U.S. Cl. 260—94.9 DA       20 Claims

ABSTRACT OF THE DISCLOSURE

Diarene chromium compounds when supported on an inorganic oxide and modified with cyclopentadiene are catalytically active for the polymerization of olefins, particularly ethylene, to produce high molecular weight solid polymers and these catalysts show an unusual utility, when used with hydrogen, to control the melt index of the polymers made therewith.

This application is a continuation-in-part of patent application Ser. No. 15,931 filed Mar. 2, 1970 which was a continuation-in-part of patent application Ser. No. 828,745 filed May 28, 1969, both of which prior applications are now abandoned.

BACKGROUND OF THE INVENTION

Diarene (bisarene) metal compounds, have been established as being catalytically active for the polymerization of olefins. The activity of certain of these compounds was initially determined to be low. U.S. Pats. 3,123,571 and 3,157,712 disclosed a procedure for improving the activity of these catalysts by using them on a support such as silica, alumina or silica-alumina.

When supported diarene chromium compounds were investigated as ethylene polymerization catalysts, it was determined that certain inherent problems existed. Although catalytically active, they were found to be most unresponsive to hydrogen, a conventional means of controlling the melt index of olefin polymers.

Since supported diarene chromium compounds are potentially attractive olefin polymerization catalysts an investigation was undertaken to determine if their response to hydrogen could be improved for the purposes of controlling the melt index of the olefin polymers made therewith.

SUMMARY OF THE INVENTION

It has now been found that, in a process for the catalytic polymerization of olefins using supported diarene chromium compounds as the catalyst, the response of the catalyst to hydrogen as a means of controlling the molecular weight of the polymer is improved by the use of a modifier, cyclopentadiene, with the supported diarene chromium compound. In addition to improving the response of the catalyst to this melt index control agent, the use of the cyclopentadiene modifier causes a change in the molecular properties of the resultant polymers.

DESCRIPTION

According to the present invention, supported diarene chromium compounds, when modified with trace amounts of cyclopentadiene, improve their behavior in response to hydrogen as a melt index control agent, and the molecular nature of the olefin polymers obtained is also improved.

The organometallic compounds which are useful in the practice of this invention as olefin polymerization catalysts are arene chromium compounds having the structure

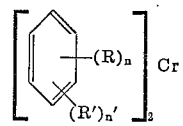

wherein R is hydrogen, $n$ is a whole number of 3 to 6, R' is an alkyl group having from 1 to about 6 carbon atoms, $n'$ is a whole number of 0 to 3, and $n+n'=6$. A nonexhaustive listing of these compounds includes dibenzene chromium,
ditoluene chromium,
di-o-xylene chromium,
di-p-xylene chromium,
dicumene chromium,
dimesitylene chromium,
di(n-propylbenzene)chromium,
di(1,3,5-triethylbenzene)chromium,
di(1,3-diethyl-4-hexylbenzene)chromium,
di(1,3-dipentyl benzene)chromium,
di(1,4-dihexylbenzene)chromium,
di(1,3,5-trihexylbenzene)chromium,
di[1-(2-methylbutyl)benzene]-chromium and the like.

The olefin monomers which may be polymerized in accordance with the present invention include monoolefins such as ethylene and other alpha olefins containing 3 to about 10 carbon atoms such as propylene, butene-1, pentene-1, 3-methylbutene-1, hexene-1, 4-methylpentene-1, 3-ethyl-butene-1, heptene-1, octene-1, decene-1, 4,4-dimethylpentene-1, 4,4-diethylhexene-1, 3,4-dimethylhexene-1, 4-butyl-1-octene, 5-ethyl-1-decene, 3,3-dimethylbutene-1 and the like. These compounds may be polymerized individually or in combination with one another. The monoolefins may also be polymerized with one or more diolefins to yield crosslinkable interpolymers. Among the diolefins which may be used in this regard are butadiene, 1,5-hexadiene, dicyclopentadiene, ethylidene norbornene and the like. Polyethylene is the preferred homopolymer. The preferred interpolymers are those containing a major amount (i.e. ≤50% by weight) of ethylene and a minor amount (i.e., <50% by weight) of one or more other monomers which are interpolymerizable therewith. The particularly preferred interpolymers are ethylene-propylene and ethylene-butene interpolymers which contain at least 80 weight percent of ethylene and up to 20 weight percent of the propylene or butene. The preferred polymers are all solid materials at a temperature of 25° C.

The modified catalyst system of the present invention is one in which the cyclopentadiene modifier is used to modify the supported diarene chromium compound. Thus, it is believed that the modified catalyst can be prepared in various ways, i.e.:

(1) by adding the cyclopentadiene to the supported diarene chromium compound prior to contact with the ethylene containing monomer charge;
(2) by contacting the supported diarene chromium compound with an ethylene containing monomer charge which also contains the cyclopentadiene;
(3) by admixing the cyclopentadiene with the diarene chromium compound and then adding the admixture to the support; and
(4) by simultaneously admixing together the support, the diarene chromium compound and the cyclopentadiene.

Since the support may act as a catalyst for the polymerization of the cyclopentadiene the cyclopentadiene should not be added to the support prior to the addition of the diarene chromium compound. The polymerized cyclopentadiene may then form a polymeric coating on the support that would be completely block the diarene chromium compound from the support. In the four catalyst preparation procedures outlined above, the diarene compound can be deposited on the support and modified thereon by monomeric cyclopentadiene before any significant blockage of the support occurs due to the formation thereon of polycyclopentadiene. The first of such catalyst preparation procedures is the preferred procedure.

The catalysts of this invention are thus preferably prepared by first adsorbing the selected diarene chromium compound on an inorganic oxide of high surface area. Adsorption is achieved by deposition of the compound on the support by adsorption from a hydrocarbon solvent, or by vapor deposition (sublimation) in the absence of a solvent. Among the various inorganic oxides which may be used to form the supported diarene chromium catalyst are silica, alumina, thoria, zirconia and comparable inorganic oxides and mixtures of such oxides. A silica-alumina mixture is the preferred support. For the catalyst to be highly effective, these supports should have a high enough surface area so as to enable them to adsorb a sufficient quantity of the diarene chromium compound so as to eventually provide sufficient contact between the catalyst and the reactive monomer. As a general rule, inorganic oxides having a surface area in the range from about 50 to about 1000 square meters per gram should be employed as the catalyst support, although the particle size of these supports is not particularly critical.

The catalyst support is preferably completely dried before it is brought into contact with the diarene chromium compound or the cyclopentadiene. Drying is normally achieved by simply heating the catalyst support with an inert gas prior to use. Drying or activation of the support can be accomplished at nearly any temperature up to about its sintering temperature for a period of time which is sufficient to remove the adsorbed water but which is not so prolonged as to cause the removal of all of the chemically bound water. It is desirable to use the flow of an inert gas stream through the support during the drying operation to aid in displacement of the water. Drying temperatures of from about 200° to 900° C. for a short period of about six hours or so should be sufficient if a well dried inert gas is used, and the temperature is not permitted to get so high as to remove the chemically bound hydroxyl groups on the surface of the support. Preferred grades of supports include G–966 silica-alumina, as so designated by W. R. Grace and Co., which has a surface area of about 500 square meters per gram and a pore diameter of 50 to 70 A.

After the diarene chromium compound has been deposited on the support in the preferred catalyst preparation procedure a modifying amount of cyclopentadiene is added. In all of the catalyst preparation procedures the amount of cyclopentadiene added is not very critical and such amount can vary from trace amounts up to about 15 moles, preferably from about 0.004 to about 12 moles, and more preferably from about 0.04 to about 4 moles, per mole of diarene chromium. The addition of the cyclopentadiene to the diarene chromium compound in all of the catalyst preparation procedures is preferably conducted in a solvent for the two compounds with sufficient stirring under an inert atmosphere to facilitate the desired modification of the diarene chromium compound.

The polymerization reaction is conducted by contacting a charge of olefin monomer substantially in the absence of moisture, air and other catalyst poisons, with a catalytic amount of the cyclopentadiene modified supported diarene chromium, at a temperature and at a pressure sufficient to initiate the polymerization reaction. If desired, an inert organic solvent may be used as a diluent in the reaction system and to facilitate materials handling.

The polymerization reaction is carried out at temperatures of from about 30° C. or less up to about 200° C. or more, depending to a great extent on the operating pressure, the pressure of other comonomers, the particular catalyst and its concentration. Naturally, the selected operating temperature is also dependent upon the desired melt index for the resulting polymer since temperature is also a factor in adjusting the molecular weight of the polymer and melt index is a measure of molecular weight. Preferably, the temperature employed is from about 30° C. to about 100° C. in the slurry or "particle forming" processes, and from 100° C. to 200° C. in "solution forming" processes. The control of temperature in these processes is thus desirable, as hereinafter more fully described, for providing various effects upon the molecular weight of the polymers, as well as in controlling the phase in which they are made. As with most catalytic systems, the use of higher temperatures produces lower weight average molecular weight polymers, and consequently polymers of high melt index. In fact, by operating at the higher polymerization temperatures, polymers having a melt index of 100 to 1000 or more may be made by the process of the present invention. Such high melt index polymers can be characterized as waxes, even though they still have a high density.

The pressure can be any pressure sufficient to initiate the polymerization of the monomeric charge to produce the desired polymers. The reaction can thus be carried out from subatmospheric pressure, using an inert gas as diluent, to superatmospheric pressures of up to about 1,000,000 p.s.i.g. or more, but the preferred pressure is from atmospheric up to about 1000 p.s.i.g. As a general rule, a pressure of 20 to 800 p.s.i.g. is preferred.

A wide range of inert organic solvent media may be employed in this invention. Such solvent media should be inert to the monomer(s), the supported catalyst, and the resulting olefin polymer, and it should be stable under the reaction conditions, temperature and pressure, that are employed. It is not necessary, however, that the inert organic solvent medium serve also as a solvent for the polymer produced. Among the inert organic solvents applicable for such purpose there may be mentioned saturated aliphatic hydrocarbons, such as hexane, heptane, pentane, isooctane, purified kerosene and the like; saturated cycloaliphatic hydrocarbons, such as cyclohexane, cyclopentane, dimethylcyclopentane and methylcyclohexane and the like; aromatic hydrocarbons such as benzene, toluene, xylene, and the like; and chlorinated hydrocarbons, such as chlorobenzene, tetrachloroethylene, orthodichlorobenzene, and the like. Particularly preferred solvent media are cyclohexane, pentane, hexane and heptane.

When it is desired to conduct the polymerization so as to achieve a high solids level in the polymerization system, it is of course desirable that the solvent be liquid at the reaction temperature. For example, when operating at a temperature which is lower than the solution temperature of the polymer in the solvent, the process can be essentially a slurry or suspension polymerization process in which the polymer actually precipitates out of the liquid reaction medium and in which the cyclopentadiene modified supported arene chromium catalyst is suspended in a finely divided form.

This slurry system is of course dependent upon the particular solvent employed in the polymerization reaction and on the solution temperature of the polymer prepared. Consequently, in the "particle form" embodiment, it is most desirable to operate at a temperature which is lower than the normal solution temperature of the polymer in the selected solvent. As for example, polyethylene prepared herein has a solution temperature in cyclohexane of about 90° C., whereas in pentane its solution temperature is about 110° C. It is characteristic of this "particle form" polymerization system that a high polymer solids content is possible even at low temperatures if agitation is provided so as to provide adequate mixing of the monomer with the polymerizing mass. It appears that while the polymerization rate may be slightly slower at the lower temperatures, the monomer is more soluble in the solvent medium, thus counteracting any tendency towards low polymerization rates and/or low yields of polymer.

It is also characteristic of the slurry process that the monomer appears to have substantial solubility characteristics even in the solids portion of the slurry so that as long as agitation is provided and polymerization temperatures maintained, a broad range in the size of the resulting particles of polymer can be achieved in the slurry. Experience has shown that the slurry technique can produce a polymerization system which has a solids content of more than fifty percent, provided that sufficient fluidizing conditions and agitation are maintained. It is particularly preferable to operate the slurry process so as to provide a system having a solids content in the range of 30–40 weight percent of polymer solids.

Operating at temperatures higher than the solution temperature of the polymer in the selected solvent medium also can produce a high polymer solids content in solution. The temperature in this embodiment must be sufficiently high so as to enable the solvent being used to dissolve at least 25–30 percent by weight of the polymer. On the other hand, the temperature must be sufficiently low so as to avoid thermal destruction of the formed polymer and the particular diarene chromium compound employed. In general, for the various solvents, temperatures within the range of about 100° C. to about 200° C. and preferably about 120° C. to about 170° C. have been found to be generally optimum for the practice of such solution polymerization reactions. However, the particular polymer being produced also has a significant effect on the optimum temperature. For example, ethylene-propylene copolymers produced by this process are soluble in many of these organic solvents at low temperatures and hence the use of such temperatures is permissible in this invention even though such temperatures may not be desired for the optimum production of ethylene homopolymers or other copolymers.

Solvents constitute one of the most significant and vexing sources of catalyst poisoning. Moreover, in prior solution polymerization processes employing transition metal-containing catalysts, the use of large quantities of solvent, i.e., a solvent-to-polymer weight ratio of the order of 20:1, was believed necessary. Such large proportion of solvent necessarily greatly increased the catalyst poisoning problem. In the present process, however, the proportion of solvent to polymer can be as low as 1:1 or even less, thereby maintaining very high levels of catalyst productivity and efficiency for the system.

When the solvent serves as the principal reaction medium, it is of course desirable to maintain the solvent medium substantially anhydrous and free of any possible catalyts poisons, by redistilling or otherwise purifying the solvent before its use in this process. Treatment with an adsorbent such as high surface area silicas, aluminas, molecular sieves and like materials are beneficial in removing trace amounts of contaminants that may reduce the polymerization rate or poison the catalyst during the reaction.

However, it is also possible to operate the polymerization reaction without an added solvent reaction medium, if desired. For example, the liquid monomer itself can be the reaction medium, either with commercially available liquefied monomers as in making ethylene-propylene copolymers using liquefied propylene and other similar commercially liquefied monomers, or by operating under sufficient pressure that a normally gaseous monomer is liquefied.

Still another advantage of the present process is provided by maintaining the catalyst and the polymer, as formed, in homogeneous solution in the solvent medium. By avoiding the formation of a polymer suspension, the reaction mass behaves surprisingly as a viscous fluid which can be pumped and handled by any of the standard techniques for handling fluids.

Still another advantage of having the polymer soluble in the diluent is that high reaction temperatures can be employed. This is advantageous because the high temperatures reduce the viscosity of the solution. They also cause the polymerization to proceed faster, and allow for a more efficient removal of the heat of reaction because of the large temperature differential between the reactor and the cooling water, and also permit control of the polymer molecular weight since high reaction temperatures generally cause the formation of lower molecular weight polymers.

To separate the polymer from the solvent medium, it is also possible to employ precipitation and filtration techniques to recover the polymer, or to concentrate the polymer/solvent mass by flash evaporation or other means of solvent removal, followed by high shear milling. A number of suitable high shear mills are commercially available and, because of the low solvent content of the solution to be treated, other devices such as vented extruders, calendering roll mills, planetary rotor mills, Banbury mills, and the like, can be successfully employed to accomplish the isolation of the polymer product. By the term "high shear mill" as used hereinafter, it is meant a mill comprising parallel rolls having intermeshing threads, and the term "high shear conditions" and "conditions of high shear" means those conditions achieved on a high shear mill or by adequately powered high speed mixers for viscous materials.

It should be understood that the high solids system can be employed with the catalyst suspended in the solvent, provided that the necessary conditions of agitation, pressure, temperature and the like are maintained so to provide contact of the monomer with the catalyst, and that the pressure and temperature are such as to initiate the polymerization of that monomer to the polymer.

It should also be understood that the invention herein contemplated includes the techniques of fluidizing the solid catalyst bed in a gaseous system and contacting it with a gaseous olefin feed thereby eliminating the use of liquid solvents and the attendant problems of solvent separation and catalyst poisons as hereinbefore mentioned.

The amount of concentration of the cyclopentadiene modified supported diarene chromium catalyst employed in this invention is not critical and primarily only affects the rate and yield of polymer secured. It can be varied from about 1 to 25,000 parts per million of catalyst, based on the weight of olefin charged. Preferably, and for the greatest economy of operation, the catalyst concentration is maintained from about 5 to 100 parts per million. Obviously, the lower the impurity level in the reaction system, the lower the catalyst conecntration that can be used. In such catalysts, the weight of the support is generally from 10 to 100 times the weight of the diarene chromium compound. However, this ratio is not critical and can be widely varied.

Care should be taken during the polymerization to avoid the introduction of moisture and air (oxygen) which are catalyst poisons.

By conducting the polymerization reaction in the presence of hydrogen, which appears to function as a chain transfer agent, the molecular weight of the polymer may be controlled. Experience has shown that hydrogen may be used in the polymerization reaction in amounts varying from about 0.001 to about 10 moles of hydrogen per mole of olefin. For most polymerization reactions, a narrow molecular weight distribution may be obtained by using from about 0.01 to about 0.5 mole of hydrogen per mole of olefin. Stated another way, the preferred range of hydrogen is from 0.001 to about 5 mole percent, based on the total reactor contents.

As previously mentioned, supported diarene chromium compounds are active olefin polymerization catalysts. Unless modified by the addition of cyclopentadiene, their flexibility is limited. As will be shown, for example, the ethylene polymers which are obtained at polymerization temperatures below 100° C. with a catalyst which is not modified in accordance with the present invention generally have a very low melt index which is mainly below a 0.01 melt index, which is typically the lowest melt index which is commercially acceptable. When hydrogen was used to control the melt index with the unmodified catalysts no appreciable response was found. It was also observed that the polymers thus produced had a high flow ratio value which indicates a broad molecular weight distribution, and molecular analysis indicated a high level of unsaturation in such polymers.

In contrast, and as will be shown in the appendant examples, the addition of cyclopentadiene remarkably increased the response to hydrogen, such that it became fairly easy to control the melt index of the product. It was also observed that the polymers were far more saturated and had narrower molecular weight distributions, as indicated by low flow ratio values. Thus it was concluded that a significant and unexpected in-situ change in the catalytic behavior of a supported diarene chromium compound could be achieved by the addition of cyclopentadiene thereto.

The properties of polymers produced in the examples disclosed below were determined by the following test methods Density=ASTM D-1505

Melt index=ASTM D-1238

Melt flow=ASTM D-1238 (at 190° C. and 440 p.s.i.)

$$\text{Flow ratio} = \frac{\text{Melt flow}}{\text{Melt index}}$$

Methyl and unsaturation analyses: The optical density of the appropriate infrared bands were measured and used in the following equations $$\text{Percent } CH_3 = \frac{(A\ 7.25\mu)\ (33.8)}{t\ (\text{mils})}$$

$$\text{Percent trans unsaturation} = \frac{(A\ 10.40\mu)\ (11.1)}{t\ (\text{mils})}$$

$$\text{Percent vinyl unsaturation} = \frac{(A\ 11.02\mu)\ (7.8)}{t\ (\text{mils})}$$

Percent pendant methylene unsaturation $$= \frac{(A\ 11.27\mu)\ (9.13)}{t\ (\text{mils})}$$

wherein A is optical density defined as log $I_0/I$ where $I_0$ is incident light and I is transmitted light, and $t$ is the thickness of the film sample.

Controls A to Q

A series of seventeen ethylene polymerization reactions, listed herein as Controls A to Q, were conducted using a supported dicumene chromium catalyst which was not modified with cyclopentadiene.

The catalyst used in each reaction was prepared by the addition of a preactivated silica-alumina support to moisture and oxygen free hexane under an inert atmosphere followed by the addition of dicumene chromium for deposition purposes. The mixture was stirred for 15–30 minutes to achieve maximum deposition of the dicumene chromium compound on the support and the resulting system was stored in hexane under an argon atmosphere between usage. The support was activated by being heated at 500° C. About 0.40–0.45 gram of the support was used as the base for the dicumene chromium used in each reaction. Unless otherwise noted below the reactions were conducted at 91–93° C. in 500 ml. of moisture and oxygen free hexane under solution conditions and under a total pressure of 300 p.s.i.g.

In Controls A to E, the details of which are listed in Table I, there is shown the effect of hydrogen and certain reducing agents on the melt index, a measure of molecular weight, of the resulting ethylene polymers.

In Controls F to K, the details of which are listed in Table II, there is shown the effect of temperature on the melt index of the resulting ethylene polymers, in the absence of hydrogen.

In Controls L to Q, the details of which are listed in Table III, there is shown the effect of temperature on polymer structure and an indication of the nature of the polymer structure which can be anticipated with a supported but unmodified dicumene chromium catalyst.

TABLE I

| Control | Reactants | | | Polymer properties | | | |
|---|---|---|---|---|---|---|---|
| | Dicumene chromium, mg. | Reducing agent | | $H_2$, p.s.i.g. | Melt index | Melt flow | Density, gm./cc. |
| | | Nature | Mmoles | | | | |
| A | 43 | | | | N.F. | 0.8 | 0.947 |
| B | 22 | Diethyl aluminum ethoxide | 0.26 | | 0.007 | 1.45 | |
| C | 22 | Triethyl aluminum | 0.25 | | 0.002 | 1.57 | |
| D | 43 | | | 50 | 0.05 | 12 | |
| E | 43 | | | 100 | 0.09 | 21 | 0.944 |

TABLE II

| Control | Polymer properties | | | | |
|---|---|---|---|---|---|
| | Reaction temperature, °C. | Yield, gm./hr. | Melt index | Melt flow | Density, gm./cc. |
| F | 71 | 113 | N.F. | 0.05 | 0.947 |
| G | 93 | 164 | N.F. | 0.8 | 0.947 |
| H | 118 | 123 | 2.21 | 184 | 0.946 |
| I | 137 | 92 | 10.8 | | 0.934 |
| J | 150 | 45 | 5.02 | 382 | 0.943 |
| K | 167 | 69 | 33 | | 0.952 |

TABLE III.—POLYMER PROPERTIES

| Control | Reaction conditions | Percent of— | | | |
|---|---|---|---|---|---|
| | | Methyl | Vinyl | Trans | Pendant methylene |
| L | See control F | Trace | 0.21 | | 0.02 |
| M | See control G | 0.51 | 0.48 | 0.03 | 0.01 |
| N | See control H | 0.75 | 0.72 | 0.07 | Trace |
| O | See control I | 1.3 | 0.80 | 0.16 | 0.04 |
| P | See control J | 0.89 | 0.63 | 0.04 | Trace |
| Q | See control K | 0.61 | 0.66 | 0.05 | 0.02 |

The data reported in Table I above shows that when the supported unmodified catalyst is used at temperatures under 100° C., and in the absence of hydrogen (Control A), the resulting polymer had a no flow (N.F.) melt index. The use of 50–1000 p.s.i.g. (pounds per square inch gauge) of hydrogen (Controls D and E) only raised the melt index of the resulting polymers to 0.05 to 0.09. The use of organo-aluminum reducing agents (Controls B and C) did not produce a significant change in the melt index of the resulting polymers.

The data reported in Table II shows that it is necessary to use temperatures in excess of 100° C. (Controls H–K) in order to produce polymers having processable melt indexes when using supported but unmodified dicumene chromium in the absence of hydrogen.

It has also been found that the supported but unmodified dicumene chromium catalyst will only provide polymers having a processable melt index when such catalyst is used in the more expensive to operate solution processes, as opposed to less expensive procedures such as the slurry process.

EXAMPLES 1 TO 9

A series of nine ethylene polymerization reactions were conducted in which there was used as the catalyst, supported dicumene chromium modified by the addition of cyclopentadiene. The support was activated at 530° C. and the supported dicumene chromium was otherwise prepared in the manner set forth in the Controls. To prepare the modified catalyst, cyclopentadiene was added under an argon atmosphere approximately 15 to 30 minutes after the addition of the dicumene chromium to the moisture and oxygen free hexane aluminum-silica slurry.

The nature of the activity of the cyclopentadiene modified supported dicumene chromium catalysts and the properties of the ethylene polymers produced therewith are shown in Tables IV and V below, respectively.

Each of the nine reactions were conducted under slurry conditions in 500 ml. of moisture and oxygen free hexane at a temperature of 92–93° C. and under a total pressure of 300 p.s.i.g. supplied by ethylene and hydrogen. In Example 5 the hydrogen pressure was 100 p.s.i.g., and in the other examples it was 50 p.s.i.g. The catalyst used in Example 3 was further modified by the addition of 0.24 mmoles of triethyl aluminum.

TABLE IV

| | Catalyst components | | | | Polymer properties | | | |
|---|---|---|---|---|---|---|---|---|
| | Cyclopentadiene | | Dicumene chromium | | | | | |
| Ex. No. | Ml. | (A) moles $\times 10^5$ | Mg. | (B) moles $\times 10^4$ | A/B | Yield, gm./hr. | Melt index, dg./min. | Flow ratio |
| 1 | 0.0005 | 0.6 | 40 | 1.4 | 0.04 | 136 | 0.03 | |
| 2 | 0.001 | 1.2 | 40 | 1.4 | 0.08 | 33 | 0.86 | 41 |
| 3 | 0.001 | 1.2 | 20 | 0.7 | 0.17 | 42 | 0.87 | 41 |
| 4 | 0.001 | 1.2 | 40 | 1.4 | 0.08 | 25 | 0.79 | 42 |
| 5 | 0.001 | 1.2 | 40 | 1.4 | 0.08 | 50 | 6.6 | 49 |
| 6 | 0.005 | 6.0 | 40 | 1.4 | 0.40 | 20 | 2.4 | 37 |
| 7 | 0.01 | 12.0 | 40 | 1.4 | 0.80 | 12 | 2.2 | 33 |
| 8 | 0.05 | 60.0 | 40 | 1.4 | 4.0 | 11 | 3.2 | 37 |
| 9 | 0.10 | 120 | 40 | 1.4 | 8.0 | 11 | 3.5 | 33 |

TABLE V.—POLYMER PROPERTIES

| | | | | | Percent of— | | | |
|---|---|---|---|---|---|---|---|---|
| Polymer product of Ex.— | Density, gm./cc. | Melt index | Melt flow | Flow ratio | Methyl | Vinyl | Trans | Pendant methylene |
| 1 | 0.956 | 0.03 | 7.9 | | 0.26 | 0.30 | 0.02 | 0.01 |
| 2 | 0.956 | 0.86 | 34 | 41 | 0.41 | 0.07 | 0.03 | 0.02 |
| 3 | 0.957 | 0.87 | 36 | 41 | 0.37 | 0.14 | 0.02 | 0.02 |
| 4 | 0.948 | 0.79 | 33 | 42 | 0.51 | 0.09 | Trace | 0.02 |
| 5 | 0.943 | 2.4 | 90 | 37 | 0.83 | 0.03 | 0.05 | 0.01 |
| 6 | | 3.5 | 115 | 33 | 0.65 | 0.05 | None | 0.01 |

EXAMPLE 10

In the manner set forth for the preparation of dicumene chromium, 35 mg. of dibenzene chromium is deposited on 0.4 gram of a heat activated (530° C.) silica-alumina support. After deposition is complete, 0.001 ml. of cyclopentadiene is added to provide a cyclopentadiene to chromium molar ratio of 0.07. The catalyst is used to polymerize ethylene in a stirred autoclave containing 500 ml. of water and oxygen free hexane at 92° C. under a pressure of 50 p.s.i.g. hydrogen and a total reactor pressure of 300 p.s.i.g. There is thereby produced in one hour 40 grams of an ethylene polymer having a melt index of 0.8 dg./minute and a flow ratio of 43.

EXAMPLE 11

The procedure of Example 10 is repeated except that 39 mg. of ditoluene chromium is used in place of the dibenzene chromium. After an hour there is produced 36 grams of an ethylene polymer having a melt index of 0.7 dg./minute and a flow ratio of 41.

The processes of Examples 10 and 11 were conducted under slurry conditions.

EXAMPLE 12

Preparation of catalyst

A series of three catalyst systems were each prepared under an inert atmosphere. The support used for each catalyst system was 0.4 gram of silica-alumina which had been activated by heating at 500° C. for at least 18 hours. The diarene chromium compound used was 40 mg. of dicumene chromium (DCC) dissolved in 4 ml. of dry hexane.

Catalyst 12(A) was the control. It was made without the use of cyclopentadiene modifier (CPDM). It was prepared by stirring the support and the dicumene chromium solution together for about 30 minutes at about 26° C. in 100 ml. of dry hexane.

Catalyst 12(B) was prepared by adding 0.001 ml. of cyclopentadiene to supported catalyst made by the same procedure used for catalyst 12(A). The cyclopentadiene, in hexane was added directly to the supported catalyst in 100 ml. of hexane and the system was stirred for an additional 10 minutes at about 26° C.

Catalyst 12(C) was prepared by adding 0.001 ml. of cyclopentadiene, in hexane, to the dicumene chromium solution. Then this resulting admixture was added to the support which was in 100 ml. of dry hexane. The resulting system was then stirred for about 30 minutes at 26° C.

Polymerization of ethylene

Each of the three catalyst systems prepared as disclosed above were then used to polymerize ethylene therewith, under an inert atmosphere, in a reactor containing 500 ml. of hexane. After the catalyst was added to the reactor, the reactor was then sealed and heated up to about 70° C., which took about 10 minutes, and then 50 p.s.i.g. of hydrogen and sufficient ethylene to provide a total pressure of 300 p.s.i.g. was added to the reactors to initiate the reactions. The reactions were each run for about 1 hour at 90° C. (exotherms caused the rise in temperature to ~90° C.). The yield, melt index (MI), high load melt index (HLMI), flow ratio (HLMI/MI) and weight percent of vinyl content of the resulting polymers are listed below in the following table:

| | Polymer properties— | | | | |
|---|---|---|---|---|---|
| Catalyst | Yield (grams) | MI, dg./min. | HLMI, dg./min. | Flow ratio | Vinyl, weight percent |
| 12(A) control, no CPDM | 90 | 0.05 | 12 | | 0.46 |
| 12(B) CPDM added to supported DCC | 39 | 0.29 | 8.6 | 30 | 0.04 |
| 12(C) CPDM/DCC added to support together | 64 | 0.45 | 22 | 50 | 0.05 |

A review of the results obtained in Example 12 discloses that the modified catalyst of the present invention can be prepared in various ways and that the polymer made with such catalysts will have higher melt index value properties, and thus be more readily processible than polymer made with the unmodified catalyst.

What is claimed is:

1. A process for the polymerization of a monomer charge to a solid polymer, said charge comprising ethylene alone or in combination with at least one other alpha olefin containing 3 to about 10 carbon atoms, which comprises contacting said charge, at a temperature and at a pressure sufficient to initiate the polymerization reaction, with a catalytic amount of diarene chromium compound adsorbed on activated inorganic oxide catalyst support having a high surface area, and modified by being contacted with about 0.004 to about 15 moles of cyclopentadiene per mole of diarene chromium compound, said diarene chromium compound having the structure

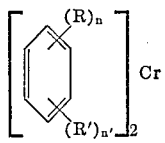

wherein R is hydrogen, R' is an alkyl group having from 1 to about 6 carbon atoms, $n$ is a whole number of 3 to 6, $n'$ is a whole number of 0 to 3, and $n+n'$ equals 6, and said inorganic oxide catalyst support is selected from the group consisting of silica, alumina, thoria, zirconia and mixtures thereof.

2. A process according to claim 1, in which ethylene is homopolymerized to a normally solid, high molecular weight polymer.

3. A process according to claim 1 in which the diarene chromium compound is dicumene chromium.

4. A process according to claim 1 in which the diarene chromium compound is dibenzene chromium.

5. A process according to claim 1 in which the diarene chromium compound is ditoluene chromium.

6. A process according to claim 1 in which the polymerization reaction is conducted in the presence of hydrogen.

7. A process according to claim 1 in which cyclopentadiene is used as the modifier in an amount of up to about 12 moles per mole of diarene chromium compound.

8. A process according to claim 7 in which cyclopentadiene is used as the modifier in an amount of from about 0.04 to about 4 moles per mole of diarene chromium compound.

9. A process according to claim 1 in which the inorganic oxide catalyst support is silica-alumina.

10. A process for the polymerization of ethylene which comprises (a) adsorbing diarene chromium compound on a substantially anhydrous inorganic oxide catalyst support having a surface area in the range from about 50 to about 1000 square meters per gram, said diarene chromium compound having the structure

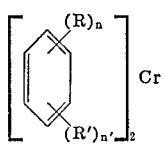

wherein R is hydrogen, R' is an alkyl group having from 1 to about 6 carbon atoms, $n$ is a whole number of 3 to 6, $n'$ is a whole number of 0 to 3, and $n+n'$ equals 6, and said inorganic oxide catalyst support is selected from the group consisting of silica, alumina, thoria, zirconia and mixtures thereof, (b) modifying the supported diarene chromium compound by contacting it with about 0.004 to about 15 moles of cyclopentadiene per mole of diarene chromium compound, (c) contacting ethylene, in the substantial absence of catalyst poison, with a catalytic amount of the cyclopentadiene modified and inorganic oxide supported diarene chromium compound at a temperature and at a pressure sufficient to initiate the polymerization reaction to form a normally solid, high molecular weight polymer.

11. A process according to claim 10 in which the inorganic oxide catalyst support is silica-alumina.

12. A process according to claim 11 in which the polymerization reaction is conducted at a temperature in the range of from about 30° C. to about 200° C. and at a pressure in the range of from about 20 p.s.i.g. to about 800 p.s.i.g.

13. A process according to claim 12, in which the polymerization reaction is conducted in the presence of from about 0.001 to about 10 moles of hydrogen per mole of ethylene.

14. A process according to claim 12 in which cyclopentadiene is used in an amount of up to about 12 moles per mole of diarene chromium compound.

15. A process according to claim 12 in which cyclopentadiene is used in an amount of from about 0.04 to about 4 moles per mole of diarene chromium compound.

16. A process according to claim 12 in which the diarene chromium compound is dicumene chromium.

17. In a process for polymerizing, to solid polymer, a monomer charge comprising ethylene alone or in combination with at least one other alpha olefin containing 3 to about 10 carbon atoms with a catalytic amount of an activated inorganic oxide supported diarene chromium compound at a temperature and pressure sufficient to initiate polymerization, wherein the inorganic oxide support is selected from the group consisting of silica, alumina, thoria, zirconia and mixtures thereof, and the diarene chromium compound has the structure

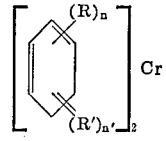

wherein R is hydrogen, R' is an alkyl group having from 1 to about 6 carbon atoms, $n$ is a whole number of 3 to 6, $n'$ is a whole number of 0 to 3 and $n+n'$ equals 6, the improvement which comprises modifying the supported diarene chromium compound by contacting it with about 0.004 to about 15 moles of cyclopentadiene per mole of diarene chromium compound prior to initiation of polymerization.

18. In a process for preparing an olefin polymerization catalyst by the adsorption of diarene chromium compound on an activated inorganic oxide catalyst support under inert conditions, and wherein the inorganic oxide catalyst support is selected from the group consisting of silica, alumina, thoria, zirconia and mixtures thereof, and the diarene chromium compound has the structure

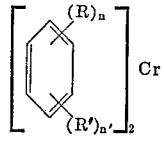

wherein R is hydrogen, R' is an alkyl group having from 1 to about 6 carbon atoms, $n$ is a whole number of 3 to 6, $n'$ is a whole number of 0 to 3, and $n+n'$ equals 6, the improvement which comprises modifying the supported diarene chromium compound by contacting it with about 0.004 to about 15 moles of cyclopentadiene per mole of diarene chromium compound.

19. A catalyst for the polymerization of olefin monomer comprising
diarene chromium compound having the structure

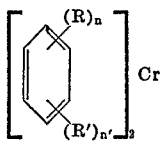

wherein R is hydrogen, R' is an alkyl group having from 1 to about 6 carbon atoms, $n$ is a whole number of 3 to 6, $n'$ is a whole number of 0 to 3, and $n+n'$ equals 6,
adsorbed on activated inorganic oxide catalyst support selected from the group consisting of silica, alumina, thoria, zirconia and mixtures thereof, and
modified by being contacted with about 0.004 to about 15 moles of cyclopentadiene per mole of diarene chromium compound.

20. A catalyst as claimed in claim 19 in which the diarene chromium compound is dicumene chromium.

References Cited

UNITED STATES PATENTS

| | | | |
|---|---|---|---|
| 3,157,712 | 11/1964 | Walker et al. | 260—94.90 A |
| 2,914,515 | 11/1959 | Stuart | 260—94.9 C |
| 3,051,690 | 8/1962 | Vandenberg | 260—94.9 C |
| 3,639,381 | 2/1972 | Craven | 260—94.9 D |

FOREIGN PATENTS

| | | | |
|---|---|---|---|
| 6803022 | 9/1968 | Netherlands | 260—94.9 C |

JOSEPH L. SCHOFER, Primary Examiner

E. J. SMITH, Assistant Examiner

U.S. Cl. X.R.

252—430, 431 R; 260—85.3, 88.2 R